US011668635B2

(12) United States Patent
Behroozi et al.

(10) Patent No.: US 11,668,635 B2
(45) Date of Patent: Jun. 6, 2023

(54) RELIABLE DETERMINATION OF CONTACT ANGLE OF SESSILE DROPS

(71) Applicant: Arizona Board of Regents on Behalf of the University of Arizona, Tucson, AZ (US)

(72) Inventors: Feredoon Behroozi, Cedar Falls, IA (US); Peter Behroozi, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 283 days.

(21) Appl. No.: 16/355,299

(22) Filed: Mar. 15, 2019

(65) Prior Publication Data

US 2019/0285530 A1 Sep. 19, 2019

Related U.S. Application Data

(60) Provisional application No. 62/643,421, filed on Mar. 15, 2018.

(51) Int. Cl.
*G01N 13/02* (2006.01)
*G06T 7/62* (2017.01)

(52) U.S. Cl.
CPC .............. *G01N 13/02* (2013.01); *G06T 7/62* (2017.01); *G01N 2013/0208* (2013.01); *G01N 2013/0241* (2013.01)

(58) Field of Classification Search
CPC ........... G01N 13/02; G01N 2013/0208; G01N 2013/0241; G06T 2207/10056; G06T 7/62; G06T 7/64
See application file for complete search history.

(56) References Cited

U.S. PATENT DOCUMENTS

| 8,474,306 B1* | 7/2013 | Behroozi | G01N 13/02 73/64.52 |
| 2014/0224990 A1* | 8/2014 | Stevenson | G01F 15/0755 250/338.5 |

(Continued)

OTHER PUBLICATIONS

Behroozi, The profile of dew drop, May 1996 (Year: 1996).*

(Continued)

*Primary Examiner* — John Fitzgerald
*Assistant Examiner* — Truong D Phan
(74) *Attorney, Agent, or Firm* — Thomas | Horstemeyer, LLP (57) ABSTRACT

Various examples are provided related to determination of contact angle of sessile drops. In one example, a method includes determining a volume of a sessile drop of fluid disposed on a test surface; determining a height of the sessile drop of fluid; and determining a contact angle of the sessile drop of fluid based upon the volume and the height of the sessile drop. In another example, a system includes a volume sensing, a height sensing, and computing that can determine a volume and height of a sessile drop using volume and height data from the sensing, and determine a contact angle of the sessile drop with the volume and the height. The contact angle and surface tension can be determined with at least three of volume, a height, a footprint radius, a radius of maximum horizontal extent, and/or an apex radius of curvature of the drop.

17 Claims, 6 Drawing Sheets

(56) References Cited

U.S. PATENT DOCUMENTS

2014/0263467 A1* 9/2014 Wardle .................. A61J 1/06
                                                        222/387
2017/0228882 A1* 8/2017 Dillingham ............ G01N 21/94
2020/0080880 A1* 3/2020 Dillingham ......... G01F 25/0084

OTHER PUBLICATIONS

Dillingham, Method and device for measuring minute volume of liquid, 2017 (Year: 2017).*
F. Behroozi, "Determination of contact angle from the maximum height of enlarged drops on solid surfaces", American Journal of Physics 80, 284 (2012.).
Behroozi, et al., "The Profile of a Dew Drop", Department of Physics, University of Northern Iowa, Am. J. Phys. 64, Sep. 1996.

* cited by examiner

Teflon:

| Volume (measured) (±0.1 μl) | Height (measured) (±0.005 cm) | Crown Radius (Best Fit) | Footprint Radius (computed) (±0.005 cm) | Contact Angle (computed) (±3°) |
|---|---|---|---|---|
| 40.0 μl | 0.300 cm | 0.268 cm | 0.207 cm | 129° |
| 30.0 μl | 0.280 cm | 0.235 cm | 0.183 cm | 130° |
| 20.0 μl | 0.250 cm | 0.198 cm | 0.156 cm | 128° |
| 10.0 μl | 0.205 cm | 0.150 cm | 0.120 cm | 127° |

FIG. 5A

Lucite:

| Volume (measured) (±0.1 μl) | Height (measured) (±0.005 cm) | Crown Radius (Best Fit) | Footprint Radius (computed) (±0.005 cm) | Contact Angle (computed) (±2°) |
|---|---|---|---|---|
| 40.0 μl | 0.195 cm | 0.430 cm | 0.330 cm | 69° |
| 30.0 μl | 0.180 cm | 0.375 cm | 0.297 cm | 69° |
| 20.0 μl | 0.160 cm | 0.310 cm | 0.257 cm | 69° |
| 10.0 μl | 0.130 cm | 0.235 cm | 0.203 cm | 68° |

FIG. 5B

Contact angle is an important parameter in characterizing the wetting properties of fluids. This information can also be used to characterize the profile shape of the drops of different materials. This information can be used in the development and control of optical switches for redirecting light by changing the profile shape of the drop. Commonly, the contact angle is measured from the profile of a sessile drop. However, this measurement gives the contact angle at one point of the contact line which may vary from point to point due to local surface defects. The first commercial apparatus for measuring contact angle from the drop profile was invented by William Zisman, who attached a specially designed microscope to a platform and used it to measure the contact angle of a drop directly from its optical image. In current practice, digital cameras are used to capture the drop profile, and proprietary fitting routines are employed to obtain the contact angle from the profile curve. Often, multiple drop images are used to increase the reliability of the measurement.

RELIABLE DETERMINATION OF CONTACT ANGLE OF SESSILE DROPS

CROSS REFERENCE TO RELATED APPLICATIONS

This application claims priority to, and the benefit of, U.S. provisional application entitled "Reliable Determination of Contact Angle of Sessile Drops" having Ser. No. 62/643,421, filed Mar. 15, 2018, which is hereby incorporated by reference in its entirety.

BACKGROUND

The surface wetting properties of fluids are generally characterized by measurement of the contact angle. Of the several methods for measuring the contact angle, the most common is to measure it directly from a profile curve of a sessile drop. This method is convenient since, to a good approximation, the contact angle is independent of the drop size for smooth and clean substrates. However, measurement of contact angle from the drop profile suffers from several well-known drawbacks. Chief among these is that this measurement method gives the contact angle at one point of the contact line and may thus differ from point to point due to variations in local surface conditions. In addition, some uncertainty is inherent in choosing the direction of the tangent line at the contact point.

Another method for measuring the contact angle can be based on the observation that the height of a sessile drop, on a horizontal substrate, approaches a maximum as its volume is increased. In 1870, the German physicist Georg Hermann Quincke (1834-1924) derived a simple but approximate equation, now known as the Quincke relation, to give the contact angle $\theta_c$ as a function of the height h for large drops, $$\theta_C = \cos^{-1}\left(1 - \frac{\rho g h^2}{2\sigma}\right). \quad (1)$$

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

See "Ueber Capillaritäts-Erscheinungen an der gemeinschaftlichen Oberfläche von Flüssigkeiten" by G. H. Quincke (Ann. Phys. Chem., vol. 139, pp. 1-89, 1870), which is hereby incorporated by reference in its entirety. In Eq. (1), g stands for the acceleration of gravity, p is fluid density, and a is the surface tension. The Quincke relation was in use through the early decades of the 20th century, but it gradually disappeared from chemistry and physics textbooks by the 1960s. The Quincke relation has been reviewed in its historical context along with a new derivation that exposes its limitations in "Determination of Contact Angle from the Maximum Height of Enlarged Drops on Solid Surfaces" by F. Behroozi (Am. J. Phys., vol. 80, pp. 284-288, 2012).

The profile curve of a sessile drop is governed by a second-order nonlinear differential equation which can be derived by the application of the Young-Laplace capillary equation. This equation may be reduced to two coupled first-order parametric equations that are rather more convenient to work with. Since there are no closed-form solutions of these nonlinear equations, approximate solutions for the profile curve may be obtained using various perturbation methods. The most mathematically rigorous of these attempts result in several algebraic parametric equations of the form $x(\theta, \varepsilon)$ and $y(\theta, \varepsilon)$; where x and y are the reduced coordinates, $\theta$ is the angle of the profile curve with the horizontal, and $\varepsilon$ is the perturbation parameter. In practice, the approximate solutions have not been of much use in obtaining reliable values of the contact angle.

DETAILED DESCRIPTION

Disclosed herein are various examples related to reliable determination of contact angle of sessile drops. The contact angle can be determined from the height and volume of the sessile drop. Reference will now be made in detail to the description of the embodiments as illustrated in the drawings, wherein like reference numbers indicate like parts throughout the several views.

This disclosure provides an alternative method for the determination of the contact angle from small drops. First, an exact expression is determined that gives the contact angle in terms of the drop parameters (e.g., crown radius of curvature, surface tension, mass, footprint radius, and height). This relationship by itself is not very practical for finding the contact angle because, among other parameters, it utilizes the value of the crown radius of curvature which is difficult to measure accurately. Additionally, the footprint radius may depend on the direction of measurement if the surface is not perfectly clean and homogeneous.

A practical alternative is to work with the governing differential equations of the drop profile. These equations can be derived by considering the equilibrium conditions for an infinitesimal surface belt encircling the drop. Next, a reliable value of the contact angle can be obtained by numerical integration of the governing parametric differential equations using the height and volume of the drop as input data. In some implementations, the volume can be derived from the mass of the drop. The resulting contact angle is the average value along the entire contact line. A reliable value of the contact angle can be computed by numerical integration of these equations without the need to measure the crown radius of curvature. The height and volume of the drop have unique vales and their measurement is sufficient to construct the profile of the drop. The integration also yields, self consistently, the footprint radius of the drop and its crown radius of curvature.

One advantage of the disclosed method over current methods is that with only two easily measured drop parameters, height and volume, a much more reliable value of the contact angle can be determined—that is, its average along the entire contact line. In practice, the drop volume is conveniently measured by using a precision syringe and/or a sensitive scale. The drop height may be determined accurately from its digital image taken next to a fine scale or by a more sophisticated tool such as, e.g., a modern cathetometer.

The disclosed method was used to obtain the contact angle of pure water on two different substrates, Teflon™ and Lucite®. For each substrate, four drops ranging in volume from 10 µl to 40 µl were used. The procedure for measuring the volume and height of these small water drops on the substrates is disclosed. The data was then used as input parameters to determine the contact angle by numerical integration of the governing equations (e.g., using Excel). The computed contact angles were consistent across the four different drop sizes for each substrate and are in agreement with typical literature values.

Figure 5A:
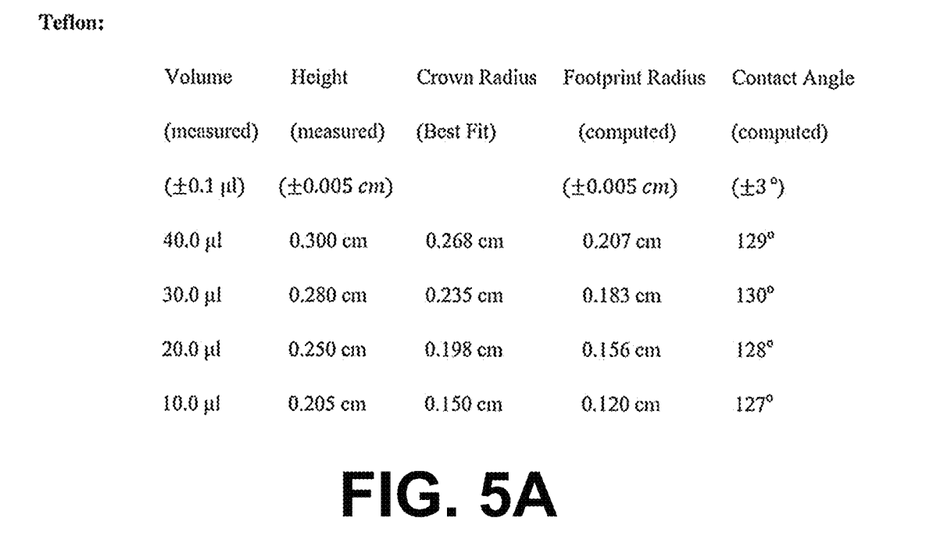
FIGS. 5A and 5B include tables presenting measured and determined values for pure water drops on Teflon™ and Lucite® surfaces, in accordance with various embodiments of the present disclosure.
Figure 5B:
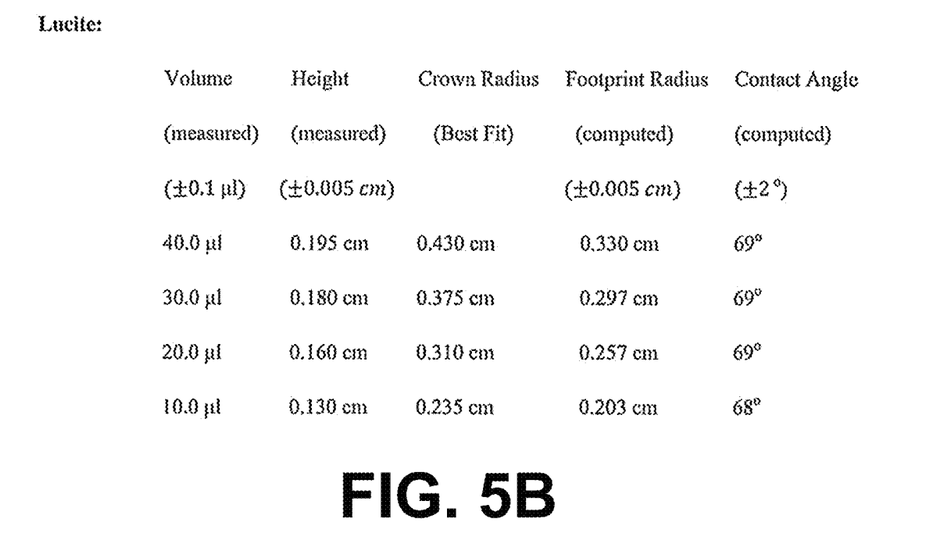

The computed values (contact angle, footprint radius, and crown radius) are given for the four drop sizes in two tables (see FIGS. 5A and 5B), one for each of the two substrates. For comparison, the contact angle values measured directly from drop images is also provided. Furthermore, the computed drop parameters (footprint radius and crown radius of curvature) plus the measured data (volume and height) were used in the exact drop equation (Eq. (7) below) to check the veracity and consistency of the numerical integration.

The elegant shape of a resting drop results from the interaction of gravity and surface tension when the total energy of the system is minimized. While the drop profiled cannot be expressed by an algebraic equation, two coupled nonlinear differential equations can describe the drop profile in differential form. The numerical solutions of these differential equations, subject to proper boundary conditions, give a true representations of the drop profile.

Figure 1:
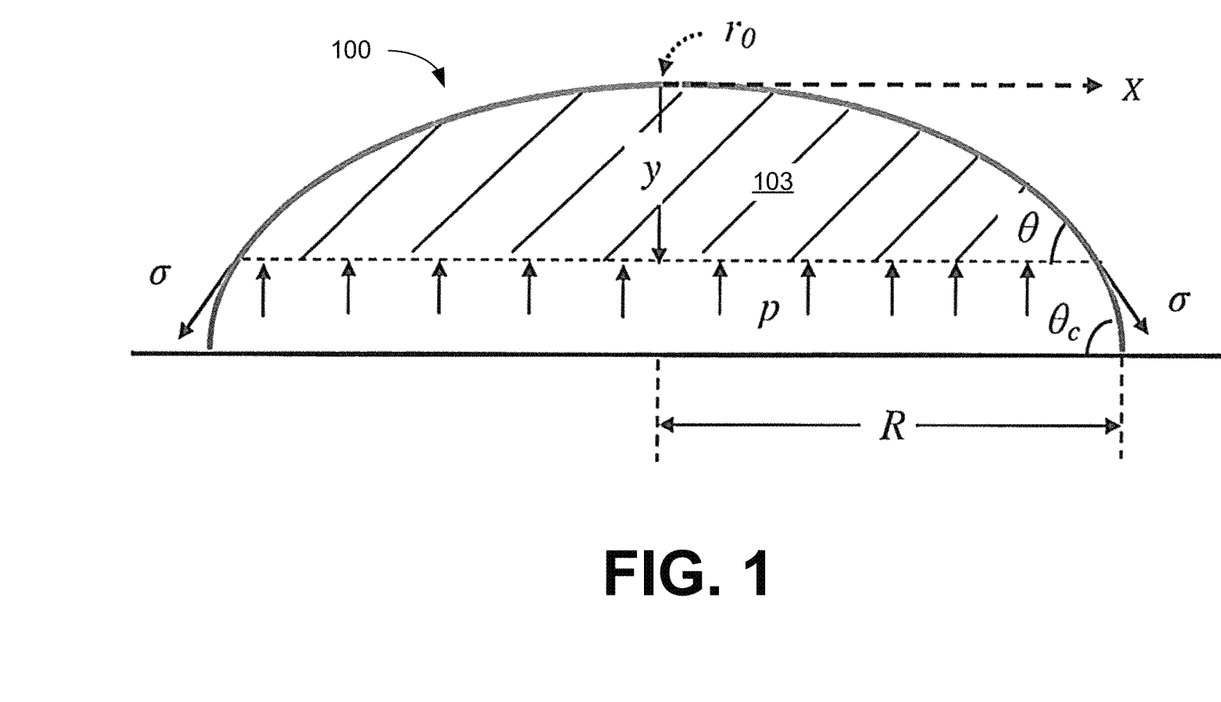
FIG. 1 is a graphical representation illustrating an example of a small sessile drop on a surface, in accordance with various embodiments of the present disclosure.

Equilibrium Equation. Referring to FIG. 1, shown is a graphical representation illustrating an example of a small sessile drop 100 of mass M, density p, surface tension $\sigma$, and height h. The crown radius of curvature is $r_0$, and the footprint radius is R. The hydrostatic pressure p and surface tension force a acting on the upper section 103 of the drop 100 are shown, while the gravitational force on the shaded region is not shown to avoid clutter. Consider the equilibrium conditions for the shaded upper section 103 of the drop 100.

The Young-Laplace relation gives the pressure difference $\Delta p$ across the surface of a liquid element in terms of its principal radii of curvature $r_1$ and $r_2$, and surface tension $\sigma$, as:

$$\Delta p = \sigma \left( \frac{1}{r_1} + \frac{1}{r_2} \right). \tag{2}$$

Therefore, the relative pressure acting on the base of the shaded section 103 in FIG. 1 is, $$p = \frac{2\sigma}{r_0} + pgy. \tag{3}$$

where the first term on the right hand side of Eq. (3) is due to the differential pressure at the crown and the second term is the hydrostatic pressure. Note that the two principal radii of curvature at the apex are degenerate and equal to $r_0$.

Furthermore, if the mass of the shaded section 103 is m and its base has radius x, then the equilibrium of forces in the vertical direction leads to, $$mg + (\sigma \sin \theta) 2\pi x = p\pi x = p\pi x^2 \tag{4}$$

Combining Eqs. (3) and (4), gives, $$\frac{2\sigma}{r_0} = \frac{mg}{\pi x^2} + \frac{2(\sigma \sin \theta)}{x} - pgy. \tag{5}$$

Clearly, the shaded section 103 of the drop 100 may be extended down to include the entire drop, in which case Eq. (5) takes the form, $$\frac{2\sigma}{r_0} = \frac{Mg}{\pi R^2} + \frac{2(\sigma \sin \theta_C)}{R} - pgh. \tag{6}$$

Therefore, $$\theta_C = \sin^{-1}\left[\frac{R}{r_0} + \left(Rpgh - \frac{\rho V g}{\pi R}\right) \bigg/ 2\sigma \right]. \tag{7}$$

Eq. (7) gives the contact angle $\theta_c$ in terms of the volume V, height h, crown radius $r_0$, and footprint radius R of the drop 100. Of these parameters, the crown radius of curvature $r_0$ is the parameter whose measurement introduces the greatest uncertainty. In practice, this measurement is nearly as prone to error as a direct measurement of the contact angle from the drop profile. Therefore Eq. (7) does not provide a practical alternative to direct measurement of the contact angle. However, it does provide a convenient check on any numerical computation as will be shown later.

Governing Differential Equations. Note that the profile curve of a sessile drop cannot be expressed by an analytic expression. However, the profile curve may be constructed for a drop of known volume and height by numerical integration of the governing differential equations of the profile. Once the drop profile is constructed the contact angle can be determined.

Figure 2:
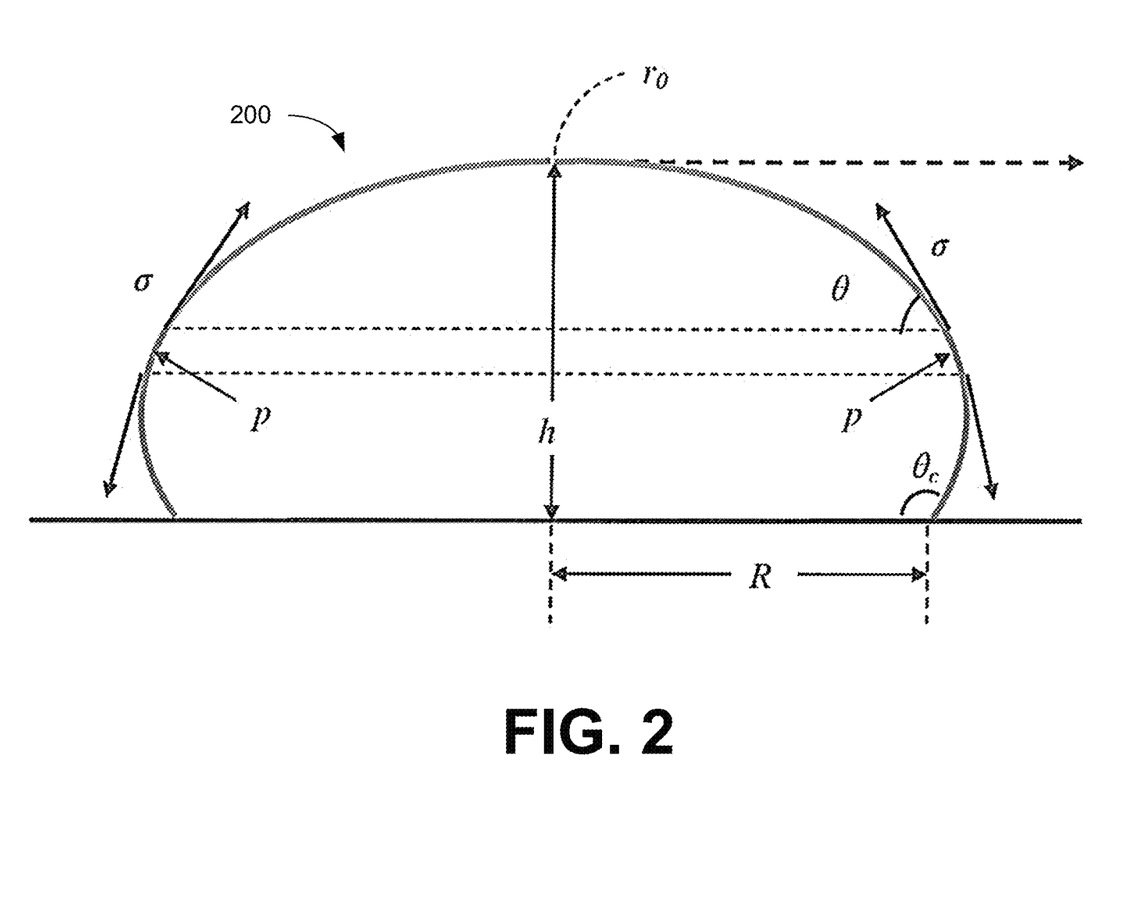
FIG. 2 is a graphical representation illustrating an example of profile of a sessile drop resting on a flat surface, in accordance with various embodiments of the present disclosure.

The governing differential equations can be derived. Referring to FIG. 2, shown is a small drop 200 with a crown radius of curvature $r_0$, height h, and footprint radius R. Consider a surface band of infinitesimal width and radius x encircling the drop 200. The equilibrium of forces acting on the surface band, in the vertical direction, requires, $$\left(\frac{2\sigma}{r_0} + \rho g y\right) 2\pi x\, dx + 2\pi x \sigma \sin\theta = 2\pi\sigma(x+dx)\sin(\theta+d\theta). \quad (8)$$

Noting that in the limit of $d\theta \to 0$, $$\sin(\theta+d\theta) \to \sin\theta + d\theta \cos\theta, \quad (9)$$

then Eq. (8) simplifies to, $$\left(\frac{2\sigma}{r_0} + \rho g y\right) dx = \frac{\sigma}{x}\sin\theta\, dx + \sigma \cos\theta\, d\theta. \quad (10)$$

or $$\frac{dx}{d\theta} = \frac{\sigma\cos\theta}{\left(\frac{2\sigma}{r_0} + \rho g y\right) - \frac{\sigma}{x}\sin\theta}. \quad (11)$$

Furthermore, noting that along the profile curve, $dy/dx = \tan\theta$, it is possible to write, $$\frac{dy}{d\theta} = \frac{\sigma\sin\theta}{\left(\frac{2\sigma}{r_0} + \rho g y\right) - \frac{\sigma}{x}\sin\theta}. \quad (12)$$

Equations 11 and 12 constitute the two parametric differential equations which govern the drop profile. An auxiliary equation gives the volume of the drop 200, $$V_C = \int_0^h \pi x^2 dy. \quad (13)$$

Contact Angle Determination. The two differential equations (11) and (12) can be integrated numerically, starting from the drop apex ($\theta=0$), to obtain $x(\theta)$, $y(\theta)$, and the profile curve $y(x)$ when the parameters $r_0$, $\sigma$, and $\rho$ are known. However, even when $r_0$ is known, to find $\theta_c$ the integration needs to be terminated at the end point of the profile curve, which is determined by knowing the value of one of the three global drop parameters (volume V, height h, or footprint radius R).

As previously discussed, the value of the crown radius of curvature $r_0$ is not typically known since it is difficult to measure with any accuracy. However, as described below, only two of the three global parameters suffice to construct the profile curve $y(x)$ and determine $r_0$, and $\theta_c$. For example, if the input data comprises the drop height h and volume V, one begins the numerical integration at the crown with $\theta=x=y=0$, and with an initial choice for $r_0=h$. The integration can be stopped when $y=h$, and the computed value of the volume $V_c$ from Eq. (13) can be compared with the measured volume V. The initial value for $r_0$ can then be adjusted up if $V_c<V$, or down if $V_c>V$ for the next round of integration. The process is repeated until $V_c \approx V$ when $y=h$ within a preset tolerance.

Note that any two of the three global parameters (volume V, height h, or footprint radius R) suffice to specify the drop geometry completely. So if the volume of the drop is not known, the measured values of its height h and footprint radius R may be used as constraints in the numerical integration to obtain the other three parameters, V, $r_0$, and $\theta_c$. When the contact angle is less than 45 degrees, the volume V and footprint radius R are better suited as the input data. In this case, the numerical integration begins at the apex and proceeds with an initial choice $r_0=R$. The integration can be stopped when $x=R$ and the computed volume $V_c$ is compared with V. The initial value for $r_0$ can then be adjusted up if the value of $V_c<V$, and down if $V_c>V$. The process is repeated until $x \approx R$ when $V_c \approx V$ within a preset tolerance.

When three or more global parameters (e.g., three or more of the volume V, height h, the footprint radius R, the radius of maximum extent $R_m$, or the apex radius of curvature of a sessile drop) are used as input data in the numerical integration, one can obtain reliable values of the contact angle $\theta_c$ as well as the surface tension $\sigma$. In this case, trial values of the contact angle and surface tension are used to generate theoretical drop profiles according to Eqs. (11) and (12), and then the global parameters are measured from the theoretical drop profile. The difference between the theoretical measurements and the actual experimental measurements is then used to update the trial values for contact angle and surface tension such that they statistically converge to the best-fitting values (e.g., using a multi-dimensional fitting algorithm such as BFGS or a Monte Carlo Markov Chain technique).

Figure 3A:
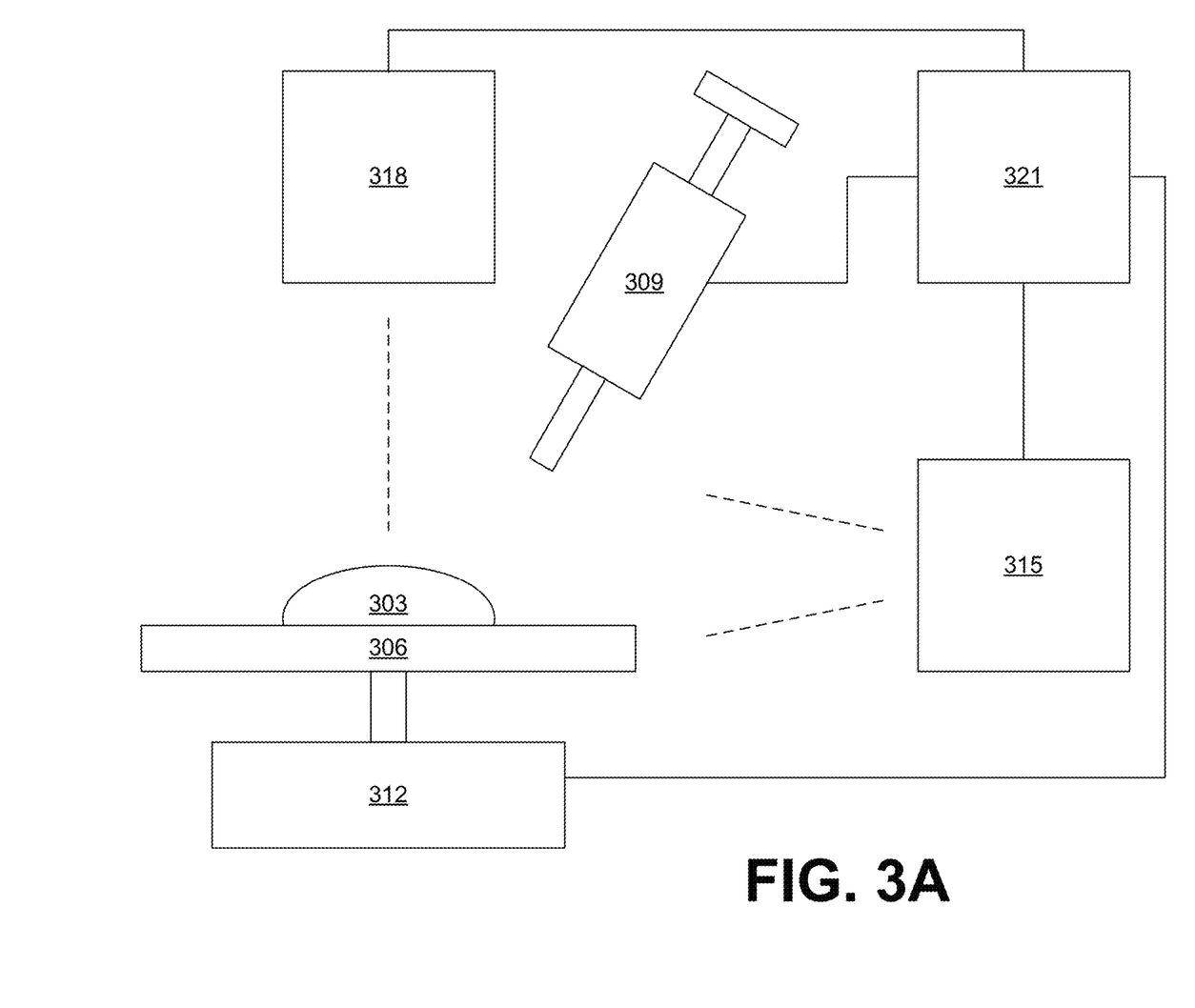
FIGS. 3A and 3B are graphical representations illustrating an example of a system for determining contact angle of a sessile drop resting on a surface, in accordance with various embodiments of the present disclosure.

Referring to FIG. 3A, shown is an example of a system 300 for determining the contact angle of a sessile drop 303 resting on a test surface 306. The system 300 can comprise a calibrated or precision syringe 309 configured to dispense a controlled amount of fluid to form the drop 303 on the test surface 306. The calibrated syringe 309 can provide the volume of the drop 303, or can be configured to dispense a defined amount of the fluid. In some embodiments, the system 300 can include a sensitive scale 312 configured to measure the weight, and thus the mass, of the sessile drop 303. The scale 312 can be calibrated with the test surface 306 in place before the drop 303 is deposited on the surface 306. The system 300 can also include an image capture device 315 (e.g., a high resolution camera) positioned to obtain an image of the sessile drop 303 on the test surface 306. The image can be used to determine the height of the drop 303. The image can include a calibrated scale or can be calibrated based upon the pixel resolution that allows the height to be determined. In some implementations, a laser interferometer 318 (or other appropriate light source) that can be directed down onto the drop 303 and measure the interference pattern to determine the height of drop 303. In other embodiments, a tool such as, e.g., a modern cathetometer can be used. The system 300 can include a computing device 321 that can obtain the height and volume information from the syringe 309, scale 312, image capture device 315 and/or laser interferometer 318. The computing device 321 can be configured to determine the contact angle using the obtained information.

An example of code that can be used to solve Eqs. (11), (12) and (13) to determine the contact angle given the drop height and volume is now discussed. For a given estimate of the crown radius of curvature ($r_0$), Eqs. (11) and (12) can be integrated using a midpoint method starting from $\theta=0$. For example, for $x(\theta)$:

$$x(\theta+\Delta\theta) \approx x(\theta) + \Delta\theta \cdot x'\left(\theta+\frac{\Delta\theta}{2}\right),$$

where evaluating $$x'\left(\theta + \frac{\Delta\theta}{2}\right)$$

requires approximating $$x\left(\theta + \frac{\Delta\theta}{2}\right) \text{ and } y\left(\theta + \frac{\Delta\theta}{2}\right):$$

$$x\left(\theta + \frac{\Delta\theta}{2}\right) \approx x(\theta) + \frac{\Delta\theta}{2} \cdot x'(\theta), \text{ and}$$

$$y\left(\theta + \frac{\Delta\theta}{2}\right) \approx y(\theta) + \frac{\Delta\theta}{2} \cdot y'(\theta).$$

An identical operation can be applied simultaneously to evaluate $y(\theta)$. The boundary conditions are $x(0)=y(0)=0$, and $x'(0)=r_0$ and $x'(\theta)=0$. The volume $V(\theta)$ can then be calculated using the midpoint method applied to Eq. (13). The integration can be terminated when $y(\theta)$ reaches the drop height h; the angle at which this happens is by definition the contact angle $\theta_c$. This yields a method to calculate the drop volume as a function of $r_0$ and h, as well as the contact angle as a function of $r_0$ and h. The Newton-Rhapson method can then be used to solve for the value of $r_0$ (if it exists) that satisfies the equation:

$$V(r_0, h) - V_{measured} = 0$$

Finally, this value of $r_0$ is used as above to determine the implied contact angle $\theta_c$. The footprint radius R—i.e., $x(\theta_c)$—may then be used to verify the solution via Eq. (7). Even with $\Delta\theta = 10^{-4}$ rad, this process takes <0.01 sec on a modern computer.

Figure 3B:
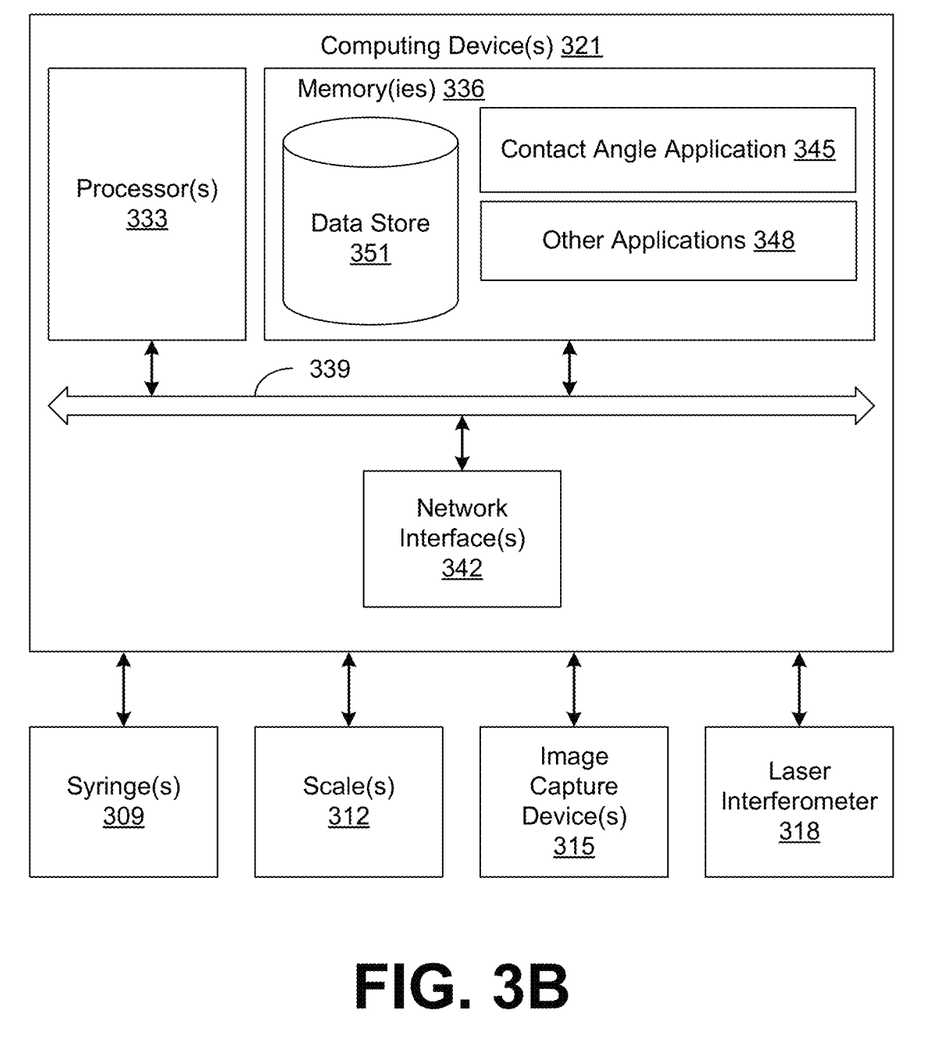

FIG. 3B shows a schematic block diagram of a computing device 321. In some embodiments, among others, the computing device 321 may represent a mobile device (e.g., a smartphone, tablet, computer, etc.). Each computing device 321 includes at least one processor circuit, for example, having a processor 333 and a memory 336, both of which are coupled to a local interface 339. To this end, each computing device 321 may comprise, for example, at least one server computer or like device, which can be utilized in a cloud based environment. The local interface 339 may comprise, for example, a data bus with an accompanying address/control bus or other bus structure as can be appreciated.

In some embodiments, the computing device 321 can include one or more network interfaces 342. The network interface 342 may comprise, for example, a wireless transmitter, a wireless transceiver, and/or a wireless receiver. The network interface 342 can communicate to a remote computing device or other components of the system 300 using a Bluetooth, WiFi, or other appropriate wireless protocol. As one skilled in the art can appreciate, other wireless protocols may be used in the various embodiments of the present disclosure. In addition, the computing device 321 can be in communication with one or more syringe(s) 309, scale(s) 312, image capture device(s) 315 and/or laser interferometer(s) 318, such as the example in FIG. 3A.

Stored in the memory 336 are both data and several components that are executable by the processor 333. In particular, stored in the memory 336 and executable by the processor 333 can be a contact angle application 345, and potentially other applications 348. In this respect, the term "executable" means a program file that is in a form that can ultimately be run by the processor 333. Also stored in the memory 336 may be a data store 351 and other data. In addition, an operating system may be stored in the memory 336 and executable by the processor 333. It is understood that there may be other applications that are stored in the memory 336 and are executable by the processor 333 as can be appreciated.

Examples of executable programs may be, for example, a compiled program that can be translated into machine code in a format that can be loaded into a random access portion of the memory 336 and run by the processor 333, source code that may be expressed in proper format such as object code that is capable of being loaded into a random access portion of the memory 336 and executed by the processor 333, or source code that may be interpreted by another executable program to generate instructions in a random access portion of the memory 336 to be executed by the processor 333, etc. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

The memory 336 is defined herein as including both volatile and nonvolatile memory and data storage components. Volatile components are those that do not retain data values upon loss of power. Nonvolatile components are those that retain data upon a loss of power. Thus, the memory 336 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 333 may represent multiple processors 333 and/or multiple processor cores, and the memory 336 may represent multiple memories 336 that operate in parallel processing circuits, respectively. In such a case, the local interface 339 may be an appropriate network that facilitates communication between any two of the multiple processors 333, between any processor 333 and any of the memories 336, or between any two of the memories 336, etc. The local interface 339 may comprise additional systems designed to coordinate this communication, including, for example, performing load balancing. The processor 333 may be of electrical or of some other available construction.

Although the control angle application 345, and other various applications 348 described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

Also, any logic or application described herein, including the control angle application 345, that comprises software or code can be embodied in any non-transitory computer-readable medium for use by or in connection with an instruction execution system such as, for example, a processor 333 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the control angle application 345, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 321, or in multiple computing devices in the same computing environment. To this end, each computing device 321 may comprise, for example, at least one server computer or like device, which can be utilized in a cloud based environment.

EXAMPLES

Figure 4:
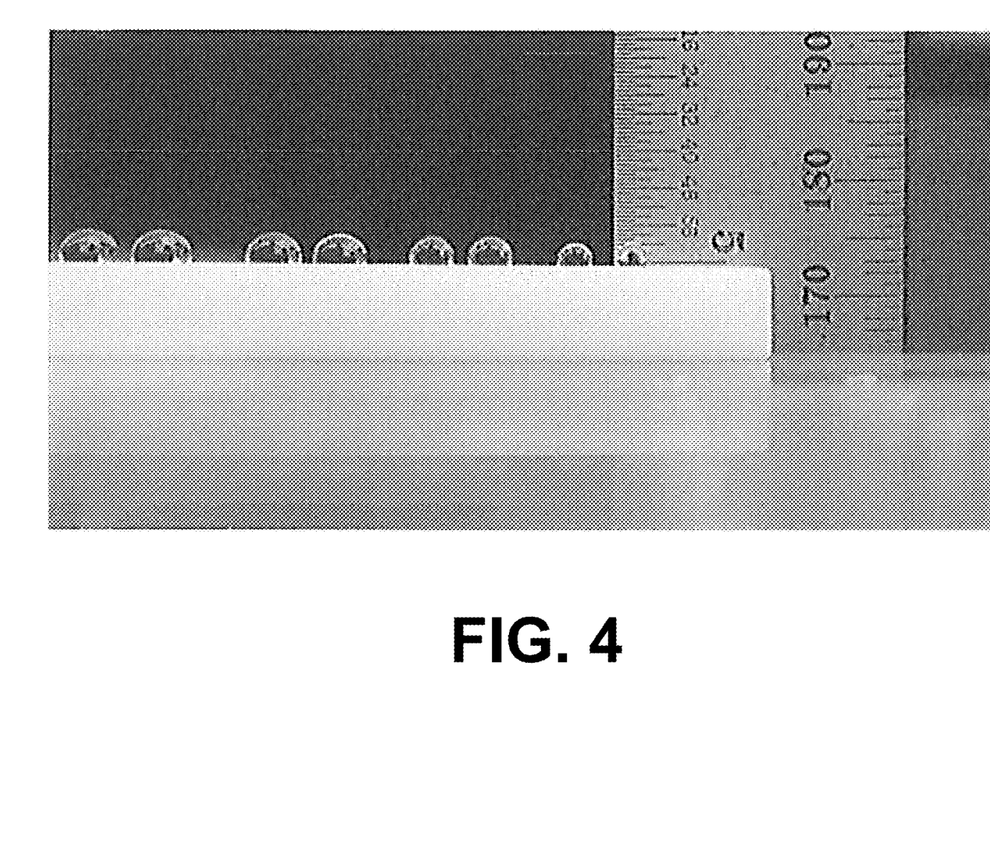
FIG. 4 is an image of four pairs of pure water sessile drops on a Teflon™ surface, in accordance with various embodiments of the present disclosure.

As a test case, the disclosed method was used to obtain the contact angle of pure water on two different substrates, Teflon™ and Lucite®. FIG. 4 is an image showing four pairs of water drops on Teflon™ for visual comparison. From left to right, the drop volume (in each pair) is 40 µl, 30 µl, 20 µl and 10 µl. The drops were photographed next to a measurement scale with fine divisions of 1/64" to show their relative heights. Measurement scales with finer resolution can also be used.

To measure the height of individual drops, each drop was deposited on a clean and smooth substrate (Teflon™ or Lucite®) by a calibrated syringe and digitally photographed next to the fine scale. Before final measurements were taken, the drops were gently shaken to establish their equilibrium configurations. In this simple set up, the height measurement is only accurate to ±0.005 cm. Use of a finer scale and/or a higher resolution camera would enhance the accuracy of the height measurement. The aim here was to provide typical input data for a case study of the disclosed contact angle approach. For pure water, a surface tension σ=72 dyne/cm and a density p=1 g/cm$^3$ was used in the determination.

Eqs. (11), (12), and (13) may be integrated using any numerical technique; but here the midpoint method was used beginning at the apex and incrementing the angle θ to determine y(θ), x(θ) and V(θ) in stepwise fashion along the profile curve. Note that at the starting point where θ=0, there is also. x=0, and y=0. Therefore, according to Eqs. (11), and (12), the values of dy/dθ, and dx/dθ are indeterminate at the apex. Employing L'Hospital's rule, then find that $$\frac{dy}{d\theta} = 0, \text{ and } \frac{dx}{d\theta} = r_0$$

at the apex.

In addition to the contact angle, the analysis also provides, self consistently, the footprint radius of the drop (x at y=h) and its crown radius of curvature. The tables in FIGS. 5A and 5B list the input data (volume and height) as well as the computed values (contact angle, footprint radius, and the crown (or apex) radius of curvature) for sessile drops, ranging in volume from 40 µl to 10 µl on the two type of substrates, Teflon™ and Lucite®.

For comparison, the experimental values of contact angle measured from the drop profile is given as:

Water on Teflon™ $\theta_c$=130°±5°.

Water on Lucite® $\theta_c$=70°±2°.

The determined drop parameters (footprint radius and crown radius of curvature) plus the measured data (volume and height) can be used in Eq. 7 to evaluate the contact angle. This task was performed with the data as recorded in the tables of FIGS. 5A and 5B for all the eight drops. As expected, for each drop the contact angle evaluated from Eq. (7) was identical to the computed value within a rounding error.

The disclosed method offers a convenient and reliable technique for measuring the contact angle. The convenience is due to the relative ease and accuracy of measuring the height and volume of a sessile drop compared with the problems encountered in measuring the contact angle directly. The reliability stems from the fact that the volume and height of a drop are single valued and represent the average condition at the fluid/solid interface. Consequently, local rough spots or surface defects do not significantly affect the outcome. The equilibrium condition for the drop as expressed in Eq. (7), shows the intimate relation of the global parameters (h, V, and R) with the intrinsic ones (σ, p, and $\theta_c$).

The primary limit to reliability is the measurement error on the drop height. For the range of drops considered here, a relative error E on the drop height translates to relative errors of about 1.5 ε on the contact angle. In the case of an axially symmetric drop, an error of about 1% can be achieved. If the drop does not have axial symmetry, then an error of less than 10% can be achieved. Wth a modern digital camera (e.g., 3-4 k pixels per dimension), a macro lens, and software to correct for residual lens distortions, relative errors of <0.5% in the contact angle are possible. The volume accuracy gives a secondary limit on reliability; for fluids that can evaporate, the use of a sensitive precision scale can help reduce systematic biases.

The contact angle method outlined here uses as input two of the three global parameters of the drop. So the resulting value of the contact angle is a global average and reflects the condition along the entire contact line of the liquid/solid interface. Consequently, local rough spots or surface defects do not significantly affect the outcome. This is not the case for the methods being currently used that visually estimate the contact angle from the drop profile.

For large drops, the height approaches a maximum value asymptotically as the volume is increased, rendering the height data insensitive to volume changes. Similarly for small contact angles, measurement of the drop height suffers from large relative uncertainty. In both of these cases, the volume and footprint radius can be used as input data for the contact angle determination. A useful extension of the method would be to couple it to a Markov Chain Monte Carlo algorithm so that all three quantities (volume, footprint radius, and height) could be used simultaneously to constrain the range of allowed contact angles.

When three global parameters are available as input data in the numerical integration, one can obtain both the contact angle $\theta_c$ as well as the surface tension $\sigma$. In practice, the volume V and height h of a sessile drop can be measured reliably and thus constitute two of the three measured global parameters. When the contact angle is greater than 90 degrees, the equatorial radius $R_e$ is the best choice for the third parameter. And when the contact angle is less than 90 degrees, the footprint radius R is used as the third parameter. In either case, integration of the governing differential equations with the trial values of the apex radius of curvature $r_0$ and surface tension $\sigma$ generate an initial theoretical profile curve. The difference between the theoretical volume, height, and equatorial radius (or footprint radius) with their experimental counterparts can then be used to update the trial values of surface tension and apex radius of curvature. By using a two-dimensional fitting routine, the procedure can be iterated until the best fitting values for the apex radius of curvature and surface tension are found which in turn provide the contact angle. However, since the footprint radius of a drop varies from point to point along the contact line due to local surface defects, its measured value is necessarily uncertain. Consequently, the computed values of surface tension and contact angle by this method reflect this uncertainty.

In contrast, when the surface tension is known, determining the contact angle from the height and volume of small drops is relatively simple and free from most of the errors and uncertainties associated with direct measurement of the contact angle from the drop image. Indeed, when the volume and height of a sessile drop are measured accurately, the disclosed method yields a very reliable value of the contact angle because the computed value reflects the global average of the contact angle along the entire solid/liquid/vapor contact line.

In summary, determining the contact angle from the height and volume of small drops is relatively simple and free from most of the errors and uncertainties associated with direct measurement of the contact angle from the drop image. Indeed, when the volume and height of a sessile drop is measured accurately, the method described here yields a very reliable value of the contact angle because the computed value reflects the global average of the contact angle along the entire solid/liquid/vapor contact line.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims. For example, as described previously, when three global parameters, (e.g., three out of the volume, height, footprint radius, radius of maximum horizontal extent, and the apex radius of curvature) are used as input, both surface tension and contact angle can be determined simultaneously. This option is particularly useful when the surface tension of the fluid under study is not known.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A system for determining a contact angle of a sessile drop on a test surface, comprising:
    a volume sensing device that provides volume data corresponding to the sessile drop on the test surface;
    a height sensing device that provides height data corresponding to the sessile drop on the test surface, the height sensing device separate from the volume sensing device; and
    a computing device configured to:
        obtain the volume data from the volume sensing device and the height data from the height sensing device;
        determine a volume and a height of the sessile drop using the volume data and height data, the height being a distance between the test surface and an apex of the sessile drop; and
        determine a contact angle of the sessile drop based at least in part upon the determined volume and the determined height of the sessile drop, wherein the contact angle is iteratively determined from the determined volume and the determined height of the sessile drop, the iterative determination using two parametric differential equations given by:

$$\frac{dx}{d\theta} = \frac{\sigma\cos\theta}{\left(\frac{2\sigma}{r_0}+\rho g y\right)-\frac{\sigma}{x}\sin\theta} \text{ and } \frac{dy}{d\theta} = \frac{\sigma\sin\theta}{\left(\frac{2\sigma}{r_0}+\rho g y\right)-\frac{\sigma}{x}\sin\theta}$$

and drop volume given by:

$$V_C = \int_0^h \pi x^2 dy$$

where x and y are coordinates of the sessile drop, $\sigma$ is a surface tension of the sessile drop, $r_0$ is a crown radius of the sessile drop, g is acceleration of gravity, and p is the fluid density, where the iterative determination ends if a computed drop volume $V_c$ equals the determined volume of the sessile drop, or is within a defined limit of the determined volume of the sessile drop, when y matches the determined height h of the sessile drop.

2. The system of claim 1, wherein the height sensing device is a laser interferometer configured to illuminate the sessile drop with a laser beam, and determine the height of the sessile drop based at least in part upon an interference pattern produced from the illumination.

3. The method of claim 1, wherein the iterative determination begins with $\theta=x=y=0$ and $r_0=h$.

4. The system of claim 1, wherein the volume sensing device is a precision syringe configured to dispense a defined volume of a fluid on a test surface.

5. The system of claim 4, wherein the volume data comprises the defined volume of the fluid dispensed by the precision syringe.

6. The system of claim 1, wherein the volume sensing device is a scale configured to determine a mass of the sessile drop disposed on the test surface.

7. The system of claim 6, wherein the computing device is configured to use the mass from the scale to determine the determined volume of the sessile drop.

8. The system of claim 1, wherein the height sensing device is an image capture device configured to obtain an image of the sessile drop formed by a fluid dispensed on the test surface, the image being of a profile of the sessile drop.

9. The system of claim 8, wherein the height data comprises the image of the profile of the sessile drop.

10. The system of claim 8, wherein the height data comprises the height of the sessile drop.

11. The system of claim 8, wherein the image capture device is a high resolution digital camera.

12. A method, comprising:
  determining a volume of a sessile drop of fluid disposed on a test surface;
  determining a height of the sessile drop of fluid; and
  determining a contact angle of the sessile drop of fluid based upon the determined volume and the determined height of the sessile drop, wherein the contact angle is iteratively determined from the determined volume and the determined height of the sessile drop, the iterative determination using two parametric differential equations given by:

$$\frac{dx}{d\theta} = \frac{\sigma\cos\theta}{\left(\frac{2\sigma}{r_0} + \rho g y\right) - \frac{\sigma}{x}\sin\theta} \text{ and}$$

$$\frac{dy}{d\theta} = \frac{\sigma\sin\theta}{\left(\frac{2\sigma}{r_0} + \rho g y\right) - \frac{\sigma}{x}\sin\theta}$$

and drop volume given by:

$$V_C = \int_0^h \pi x^2 dy$$

where x and y are coordinates of the sessile drop, $\sigma$ is a surface tension of the sessile drop, $r_0$ is a crown radius of the sessile drop, g is acceleration of gravity, and p is the fluid density, where the iterative determination ends if a computed drop volume $V_c$ equals the determined volume of the sessile drop, or is within a defined limit of the determined volume of the sessile drop, when y matches the determined height h of the sessile drop.

13. The method of claim 12, wherein the determined volume of the sessile drop is a volume of the fluid dispensed by a precision syringe onto the test surface.

14. The method of claim 12, wherein the determined volume is determined based upon a mass of the sessile drop disposed on the test surface.

15. The method of claim 12, wherein the determined height of the sessile drop on the test surface is determined based upon a profile image of the sessile drop.

16. The method of claim 12, wherein the determined height of the sessile drop on the test surface is determined based upon an interference pattern produced by illuminating the sessile drop with a laser interferometer.

17. The system of claim 12, wherein the iterative determination begins with $\theta=x=y=0$ and $r_0=h$.

* * * * *